Oct. 5, 1965     T. K. PETERSEN ETAL     3,209,929
AIR OPERATED CARGO LOADING SYSTEM

Filed Dec. 23, 1960     4 Sheets-Sheet 1

INVENTORS
THORVALD K. PETERSEN
PAUL L. SMITH
BY J. Edwin Coates
ATTORNEY

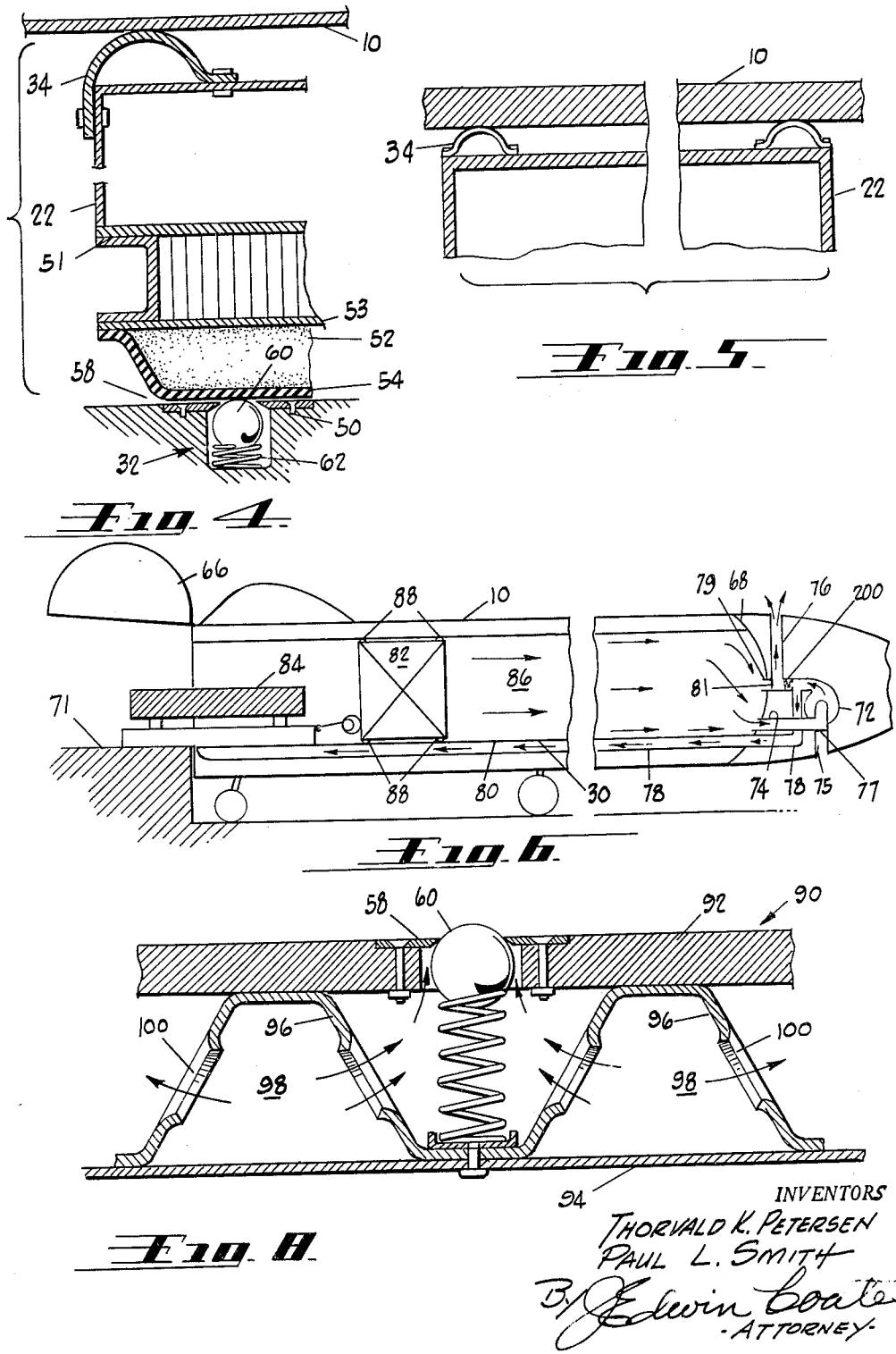

Oct. 5, 1965    T. K. PETERSEN ETAL    3,209,929
AIR OPERATED CARGO LOADING SYSTEM
Filed Dec. 23, 1960    4 Sheets-Sheet 4
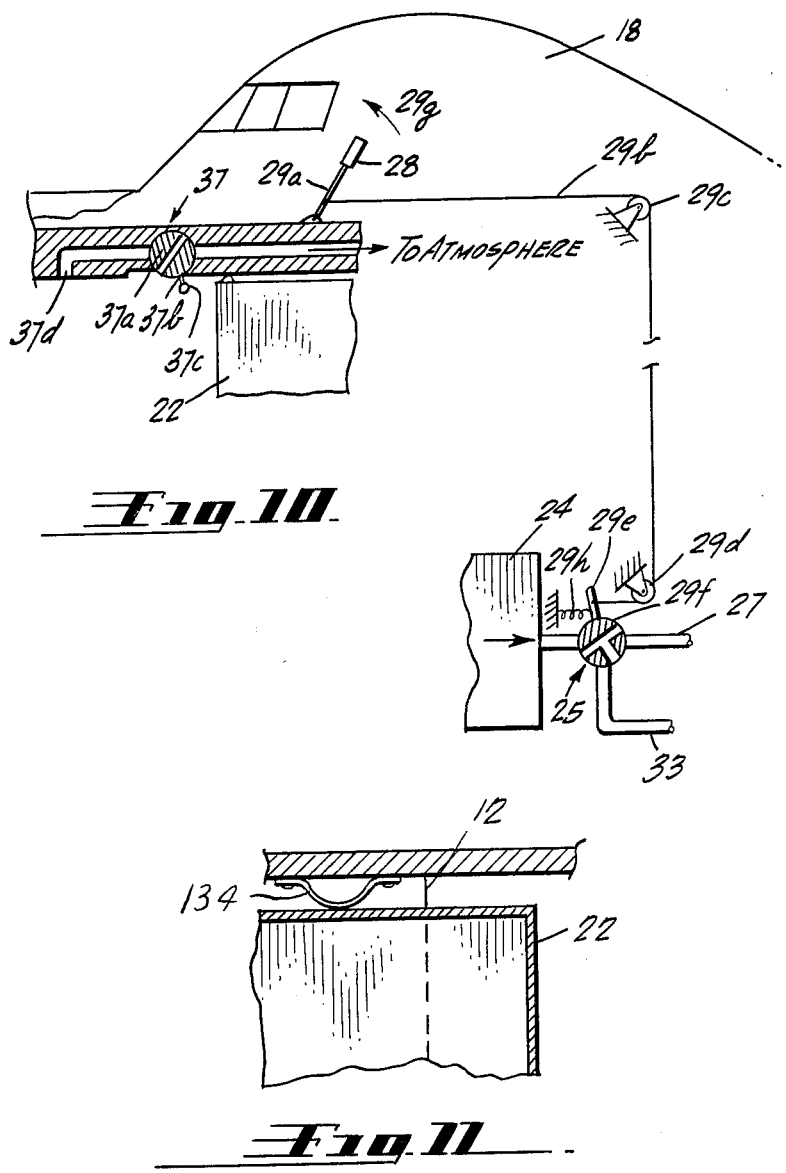
INVENTORS
THORVALD K. PETERSEN
PAUL L. SMITH
BY
Leon D. Rosen
ATTORNEY United States Patent Office 3,209,929
Patented Oct. 5, 1965

3,209,929
AIR OPERATED CARGO LOADING SYSTEM
Thorvald K. Petersen and Paul L. Smith, Santa Monica, Calif., assignors to Douglas Aircraft Company, Inc., Santa Monica, Calif.
Filed Dec. 23, 1960, Ser. No. 77,978
4 Claims. (Cl. 214—83.28)

This invention relates to cargo aircraft and particularly to the loading and unloading of their cargo.

Aside from the many difficulties attendant upon transporting items of cargo on the airport from receiving stations or docks to the cargo ports of cargo aircraft, it is an even more onerous, time-consuming and costly operation to load each cargo item successively into the cargo hold of the craft and move it into its final stowed position in the hold.

Usually, each individual item must be trucked to a point adjacent a side cargo door or a "swing-nose" opening or "swing-tail" opening giving access to the hold, after which it is lifted from the truck and manually moved forward or aft to stowage position. Although several items may be placed in a standard container and the cargo thus partially consolidated, even so each such filled container, weighing 4100 pounds, for example, is ordinarily shoved into position by a number of men working in the hold. Since the coefficient of friction between the bottom of the ordinary container and even the smoothest cargo hold floor is quite high and since all but the last few of the containers must be shoved from one end of the hold to, or nearly to, the opposite end of the hold, it will be apparent that a considerable number of men, effort and time must be employed to completely fill the cargo hold.

The present invention provides means and methods for minimizing the efforts and numbers of loading-men required, and hence also minimizes the expensive gate time required in loading and unloading a cargo airplane.

Briefly stated, it does so, first, by means combined with the entire length and breadth of the cargo floor for reducing the sliding friction between the cargo and the floor. One form of these means comprises a system incorporated in the floor and including a plurality of longitudinally and laterally spaced apertures in the floor, each aperture containing a normally spring closed ball valve protruding slightly above the floor, each valve communicating with a single source of pressurized air. When a container bottom contacts and depresses the balls, the valves emit air, thus establishing between the bottoms of the containers and the upper surface of the floor a film of pressurized air, at a pressure of the order of 5 p.s.i. to 14 p.s.i.. The air is emitted and disposed in such a manner as to both lubricate and somewhat buoy up the containers. Although there may be some loss of this air around the edges of the containers, it is sufficient to reduce the coefficient of friction to 0.01. Thus, in order to move a container weighing even as much as 4100 pounds, a total thrust thereon of only 41 pounds, maintained, would be sufficient to move it from one end of the hold to the opposite end. At the same pressure, each successive container serves as hereinafter detailed when positive pressure is applied to its rear face, as a piston for urging preceding, but not yet finally positioned containers, ahead of it into their final positions, the piston also finally assuming its stowed position. If a vacuum is employed the containers are, by the air pressure differential on their rear faces, induced to successively move into their final stowed positions.

In another species of the invention for reducing the sliding friction, the bottom face of each container is provided with a plurality of resiliently compressible discs, each container having an air plenum chamber therein connected to a single source of pressurized air. Preferably, the discs are each articulatedly mounted to the container's bottom. The piston principle is applied here, also.

Thus it will be seen that combined with this friction reducing means is a pneumatic container-moving system based on the principle of pneumatic-piston action. The piston action may be accomplished either by a positive air pressure on the rear face of successive containers or of a discrete piston, or by creating a vacuum on the front face thereof. Pressure or a vacuum may be created by an air turbine and used to either load or unload the containers. That is, vacuum may be applied to the front of the containers to cause the pressure differential to load the containers into the hold and the vacuum creating turbine or pump may then be reversed in operation to apply, through suitable conduitry, a pressure directed oppositely to the effect of the vacuum to move the containers to the exit port.

In another form, pressure is employed on one end face of the containers to load the containers into one end of the hold and pressure applied in the reverse direction on the end face of the container at the opposite end of the train of stowed containers is then utilized to unload the containers from the opposite end of the hold.

In still another form, a discrete piston, separately installed in the hold, initially occupies a position near one end, preferably the nose end, of a "swing nose" fuselage, and includes means decouplably coupling its rear face to a cargo train on the loading dock and is induced by means creating a vacuum behind it to move rearwardly in the hold, dragging the train on the friction-reducing floor, from one end of the hold almost to the other end thereof. To unload, the direction of operation of the vacuum creating means is reversed to now apply a positive pressure to the rear face of the piston resulting in forward movement of same which urges the cargo train ahead of it and out of the swing nose opening onto the loading dock.

Thus, in all forms of the invention there is a fuselage having a cargo space including a friction-reducing means between the cargo unit and the floor, and means in the fuselage for establishing an air pressure differential on either one of the vertical faces of the upright rectangular end-positioned container or piston, thus to move the cargo forwardly or rearwardly, according to the direction of the resultant of the air-pressure differential, thereby either to load or unload the cargo.

Although hereinafter described in conjunction with loading and unloading of airplanes, it will be apparent to those skilled in the art that the invention is equally well adapted for use in loading and unloading trucks, railway cars or other more or less hollow or tubular vehicle bodies.

Several embodiments of these and other concepts are, by way of example only, representationally depicted in the accompanying drawings and are described hereinafter in conjunction with these drawings.

In these drawings,

FIG. 4 is a fragmentary longitudinal sectional view of one of the containers of FIG. 1 and incorporating a diagrammatic showing of a portion of the friction-reducing floor on which it rests;

FIG. 5 is a fragmentary longitudinal view showing the sealing means utilized on each container and on the discrete piston of FIG. 6;

Figure 1:
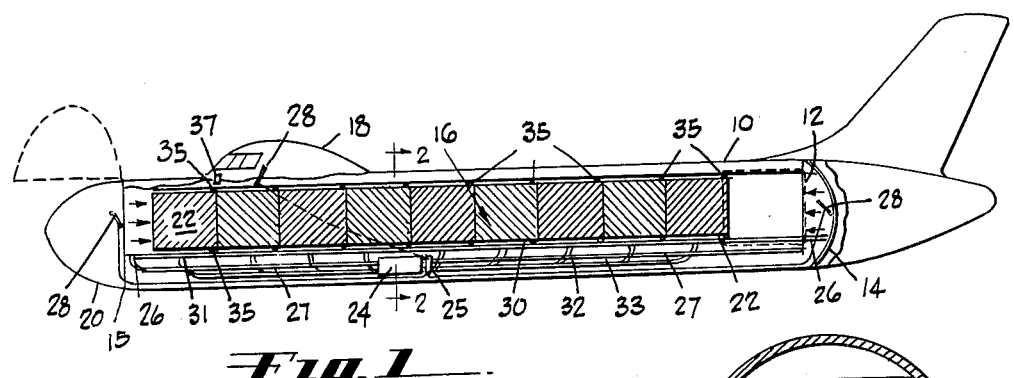
FIG. 1 is a fragmentary longitudinal sectional view of the fuselage of a cargo airplane provided with the positive pressure piston-type loading and unloading system of this invention in combination with a friction-reducing floor.
Figure 2:
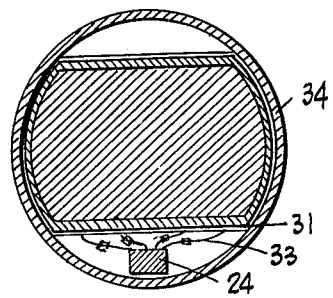
FIG. 2 is a section thereof on line 2—2 of FIG. 1.
Figure 7:
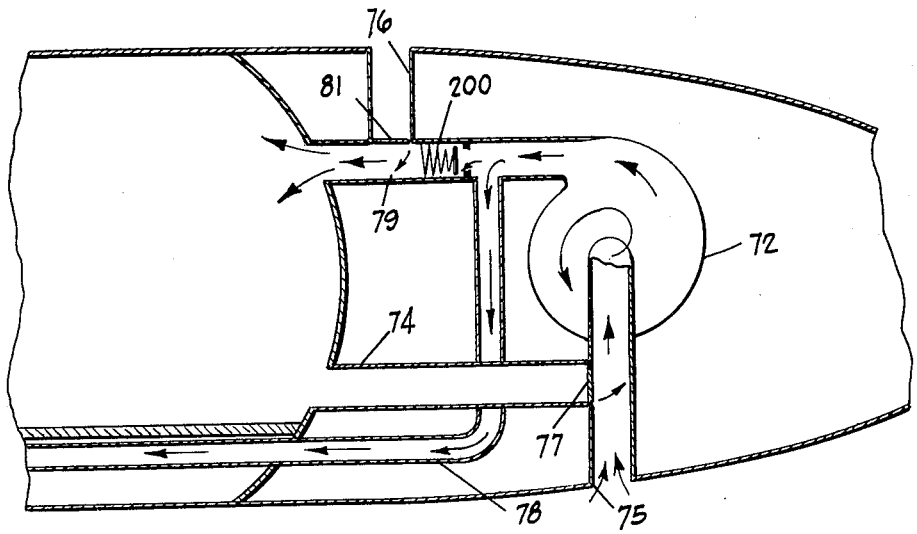
Figure 9:
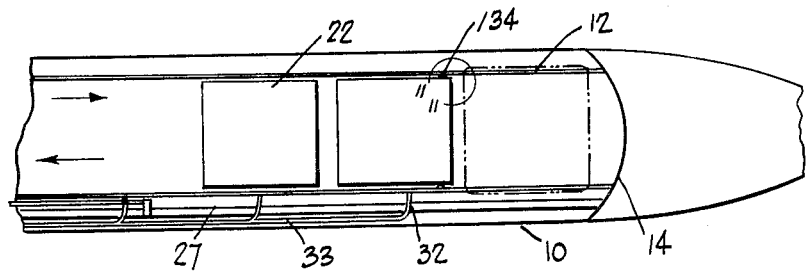

FIG. 6 is a diagrammatic longitudinal section of a cargo airplane of the nose-loading type in which a cargo-actuating discrete piston is actuated by an air turbine capable of operation in one direction to create a vacuum for inducing rearward movement of the piston, dragging a cargo-train on the friction-reducing floor, the turbine and ducting acting in the reverse direction to apply compressed air to the stowed piston, urging the cargo train from stowed position onto the unloading dock;

FIG. 7 is a view similar to that of FIG. 6 showing the positions of the valves to effect actuation of the piston by positive pressure thereon acting in a direction to urge the piston forwardly and to cause it to unload the cargo;

FIG. 8 is an enlarged sectional detail of the friction-reducing floor that is shown in FIG. 4;

FIG. 9 is a diagrammatic fragmentary view, similar to that of FIG. 1, in which seals are omitted from the containers and a single peripheral seal is provided around the periphery of the cargo space just forward of the side-access door, thereby obviating the necessity for closing the door each time a container is unloaded by pressure and loaded by vacuum;

FIG. 10 is an enlarged partial diagrammatic view showing the details of operation of the control and valve apparatus of FIG. 1; and FIG. 11 is a detailed view of area 11—11 of FIG. 9.

Referring now in detail to FIG. 1, there is shown a fuselage 10 having a rearwardly located cargo access door 12 for use in loading and unloading a sealed cargo hold 16 from the rear, the aft end of hold 16 including the usual pressure bulkhead 14 adjacent the door 12. The aircraft controls and the crew are housed in a "bubble" type nacelle 18 atop the forward portion of the fuselage.

Since the invention contemplates that the hold 16 may also be loaded and unloaded from the forward end or nose of the fuselage, same is also provided with an upwardly and downwardly swinging nose-section 20, properly sealed to the front edge of the hold 16.

The hold is shown loaded with generally rectangular upright cargo containers 22 having front, rear, top and bottom faces and arranged in their final juxtaposed positions.

Underneath the special floor 30 of the cargo hold is a compressed air source 24 which may be a suitable air compressor driven either by the craft's engines, not shown, or by an electric motor, or an auxiliary turbine, not shown. An external, ground supported source may also be employed which may be either a pressure source or a vacuum source.

Opening into each of the sealed spaces adjacent the pressure bulkhead 14 and the forward bulkhead 15 is an outlet in each of a pair of pressurized air conduits 27 leading respectively forwardly and rearwardly from the source 24. A conventional three-way pneumatic valve 25 shown in greater detail in FIG. 10 is incorporated in the system between the compressor and the two conduits 27 and 33. In the crew's compartment 18 is a suitable valve operating means connected to valve 25 by conventional linkage and operated by a handle 28. The details of the valve 25 and its connection to the handle 28 in the crew compartment 18 are shown in detail in FIG. 10. The handle 28 is attached to a pivotally mounted lever 29a. One end of a cable 29b is attached to the lever 29a, and the cable rides over two pulleys 29c and 29d fixed to the airplane, and extends to the area of the valve 25. The opposite end of the cable is fixed to a lever 29e, the lever being fixed to a rotatably mounted valve cylinder 29f of the valve 25. Moving the handle 28 in the direction of the arrow 29g pulls the cable and causes the valve cylinder 29f to rotate to a position wherein it distributes compressed air from the source 24 to the conduits 27 and 33. A spring return 29h returns the valve cylinder to its closed position when the lever 28 is moved in a direction counter to the arrow 29g. A similar handle 28 for operating valve 25 is also located alongside the door 12 and another one is disposed rearwardly of the nose section 20 to enable the loading crew to pressurize and de-pressurize the two conduit systems 27 and 33.

The friction-reducing floor 30 is provided with a plurality of longitudinally and laterally spaced pressure-air outlets 31, each outlet including a spring loaded normally closed ball valve 32 with the ball protruding, normally, above the floor 30, the valve being such as that detailed in FIGS. 4 and 8 and later described. When depressed by contact therewith of a container 22, several of these valves, then lying under the container, emit a sufficient amount of air, at a sufficient pressure, onto the lower face of the container to form a lubricating film between it and the floor. It has been ascertained that for a container weighing, for example, 4100 pounds an air pressure of the order of 5 p.s.i. is sufficient to reduce the coefficient of friction to the order of about .01 thus reducing to 41 pounds the thrust from outlets 26 necessary to urge each 4100 pound container longitudinally to its final position.

In order to take full advantage of the compressed air thrust on the vertical front or rear face of the containers in loading or unloading same, each container is provided near each end with a non-inflatable seal 34, FIG. 5, circumscribing the container transversely. As shown in FIG. 4, no seal need be placed on the bottom face inasmuch as the bottom face is always close to the floor 30. The seal is in the form of a hollow, elastomeric semi-torus and may be attached at each of its spaced edges to the top and adjacent end of the container, as shown in FIG. 4, or both edges may be attached to the top face of the container, as shown in FIG. 5. With seals on each container, when each of the containers, including the first one, is successively urged into its final stowage position, there would be a back pressure of air from its rear face impeding the forward movement of the following container. In order to relieve this back pressure, a conventional trip-type air pressure relief valve 37 is provided in the forward part of the hold and operates when the stowed container contacts it and is being locked in place. The details of the trip type valve 37 are shown in FIG. 10. The valve 37 includes a rotatably mounted cylinder 37a to which is attached a lever 37b. A ball handle 37c is fixed to the end of the lever 37b. Cargo holding containers 22 contact the ball handle and rotate the valve cylinder 37a to an open position wherein trapped air can flow through a conduit 37d to the atmosphere. Or, a manual operation of relief valve 37, of a conventional type, not shown, may be employed. The valve 37 is particularly useful in embodiments of the invention of the type shown in FIGURE 9 wherein the object or container is moved by compressed air toward an otherwise sealed area of the cargo space.

Each container is provided on its bottom face with a lamina or pad of resiliently compressible material 52, as in FIG. 4, attached by its upper face to a rigid planar member 53, in turn spacedly attached to the rigid floor of the container by channel members 51. Suitable filler material, such as a paper honeycomb core or the like, may occupy the space between the floor of the container and the rigid member 53.

In loading the hold 16 through the rear cargo door 12 with the latter open, the container is inserted through the door opening into the hold and rests on the friction reducing floor. The door is then closed and, with the nose section 20 also closed, control 28 is so operated as to cause the conventional three-way regulating valve 25, to apply compressed air to the rear face of the container sufficiently long to urge it forwardly clear of the door.

This control movement also feeds air from the compressor through the regulating valve 25 to the outlets 32 in the friction-reducing floor. It has been ascertained that an air pressure differential of ¼ p.s.i. exerted on a container of 9400 sq. in. area produces a thrust of 2350 pounds more than adequate to move a container weighing 4100 pounds, for example, to stowed position. This same pressure differential will also move into stowed position a train of containers weighing 70,000 pounds if same is resting on, and opening, the the air emitting valves in the friction-reducing floor with a coefficient of friction of .01.

As soon as the container first introduced into the hold has been positioned just forwardly of the front edge of the door 12, another container is inserted, as before, through the door onto the rear portion of the friction-reducing floor and the air from 24 is again directed, by means of lever 28 to both the rear face of the container and the outlets 32 in the floor. The action described above then ensues and the air pressure on the rear face of the newly inserted container not only moves same forwardly but causes this container, in the manner of a piston, to bear against and urge the first-inserted container forwardly to stowage position if it is not already in that position.

The foregoing procedure is repeated for third, fourth, fifth, etc. containers, the last inserted container always serving as a piston to urge, via the intervening juxtaposed containers, the previously inserted container into its final position in the foremost portion of the hold.

Conventional container-locking means 35 are provided on the container and on the floor at corresponding stowage loci of the container for automatically locking the containers in place as they are stowed.

If desired, the two seals may be omitted from each container and a single one of them may be mounted to the inner periphery of the hold at the forward edge of the door 12, as shown at 134 in FIG. 9. Containers may be moved to the front of the airplane by creating a vacuum at the forward end of the cargo holding space, and moved back to the door 12 by compressed air. This will be explained in detail hereinafter in connection with FIGS. 6 and 7 for a piston-like vehicle to which cargo units are attached. The door 12 can hence be left open, for the single seal ahead of it will preserve the vacuum ahead of the containers and the air-pressure differential will result in forward movement of the successive containers or the train of containers.

It has been ascertained that a plurality of loaded containers totalling 77,000 pounds in weight can be urged forwardly to place the first inserted container, and successive ones, in their final stowage positions by a pressure totalling 41 pounds on each container but exerted primarily on the rear face of the last container, assuming the containers to weigh 4100 pounds and be 8′ x 8′ x 8′ in size.

Figure 3:
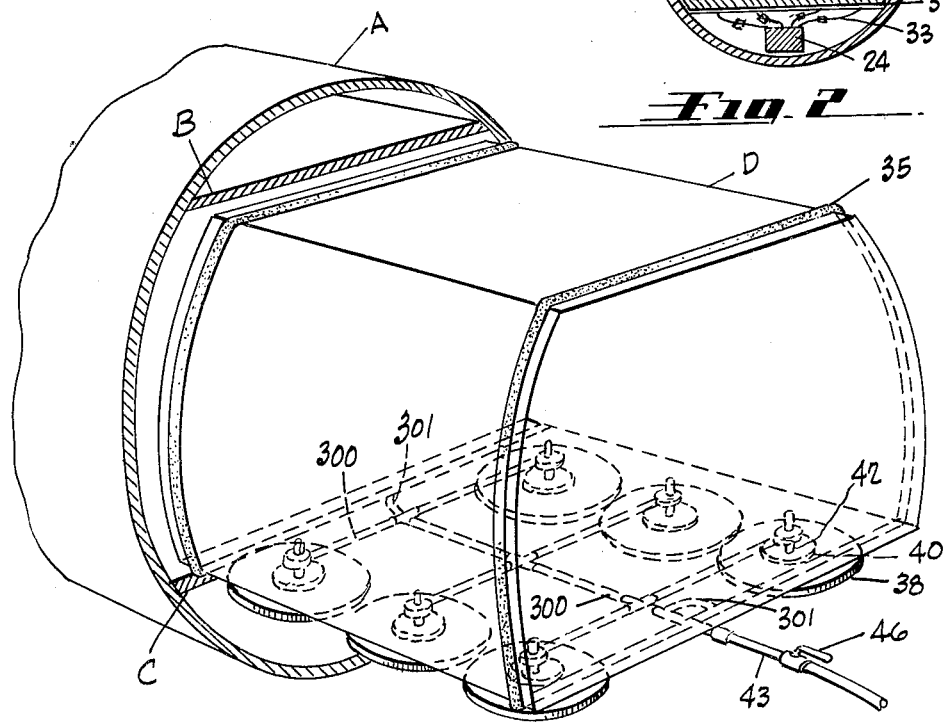
FIG. 3 is a fragmentary perspective view of a fuselage, the hold floor of which is conventional, showing a cargo-container provided with friction reducing means for cooperating with the "glide" floor or for facilitating its movement on the ordinary cargo hold floor.

In FIG. 3 there is shown a tubular vehicle body A provided with a ceiling B and a floor C, the latter being a conventional plywood surfaced floor, lacking the friction-reducing means of the other forms of the invention and therefore having, in itself, a rather high coefficient of friction. By means of a special construction of the bottom of container D, the coefficient of sliding friction between the container and the floor may well be reduced from, for example, 0.2 to, for example, 0.01.

This construction comprises at least three discs, 38, here shown as six in number. Three is the minimum number of discs to maintain a stable relationship between the floor and the container. Each disc 38 is composed of a resiliently compressible pad, preferably faced off with a wear resistant sheet, not shown. Each disc includes a central concavity 40 on its lower face, here designated a plenum chamber, for receiving compressed air fed through a hose 43 including branches 300 opening into the plenum chamber. Other branches 301 feed each of a pair of elastomeric, semi-toroidal inflatable seals 34, each of which seals extends transversely of, and peripherally around, each end-portion of the container. The seals, when inflated, establish air-tight contact for the container with the inner face of the tubular vehicle body. A ball and socket type of post connection 42, articulates each disc to the bottom of the container to enable the discs to adjust to irregularities in the floor. Details of construction of this device are disclosed more fully in the copending application of T. K. Petersen and G. A. Thompson, Serial No. 53,974 filed September 6, 1960.

The pressure air supplied to the plenum chambers 40 is emitted over the lower surface of each of the discs and of the bottom of the container and provides a film of pressure air at 5 p.s.i., for example, that both lubricates and buoys up the container. Thus, a maintained pressure of about ¼ p.s.i. is sufficient to move a plurality of these containers into stowed position, from one end of the cargo space to the other.

In FIG. 6 the principle of an air pressure differential-operated piston-type loading and unloading system is shown, broadly stated, as applied in the form of a discrete piston 82 mounted in the cargo hold 86 for aft movement, pulling into stowage position a cargo-unit 84 or a train of such units, 84, decouplably coupled thereto. Aft movement of the piston and cargo are shown as achieved by means of a vacuum established by a conventional air-suction turbine 72 installed in the tail portion of the fuselage and having an intake 75 communicating with the atmosphere and an exhaust 76 also so communicating. Through a pressure bulkhead 68 in the aft end of the sealed cargo hold 86, rearwardly extends a vacuum intake 74 for exhausting the air from the hold aft of the piston and establishing a partial vacuum therein. The intake 75 to the turbine includes a normally closed flap valve 77 to enable the turbine to remove the air in the hold and discharge it through the exhaust 76. A pressure-air conduit 79 leading at one end into the cargo hold and communicating at the other end with the turbine, includes a normally closed valve 81. A conduit 78 communicates at one end with the pressure exhaust line 76 of the turbine and runs longitudinally under the friction-reducing floor 30 of the hold, dead-ending at the front end portion of the floor. Floor 30 includes a plurality of the valved outlets each constructed as described with reference to FIGS. 4 and 8 and spaced and disposed longitudinally and laterally as aforestated, as and for the purposes aforestated. A spring-loaded valve 200 is provided and located as shown for the purpose of building up the pressure of the air to the friction-reducing floor to a magnitude of the order of 5 p.s.i.

The piston 82 substantially fills the cross-sectional dimension of the air-sealed hold and bears a pair of elastomeric seals 88 such as those previously described in conjunction with the description of the structure of the cargo-containers of FIG. 4.

The front end of the hold hingedly supports a swing-up nose section 66.

In operation, when the section 66 is upwardly positioned and locked, a cargo-unit or train 84 on a loading platform 71 is coupled to the piston 82, then in its rearmost position.

The air turbine is operated to establish a vacuum aft of the piston so that the air-pressure differential acting on the piston will displace it aftwardly as long as the turbine is so operating. The friction of the piston and cargo train on the floor is minimized by the friction reducing means in the floor, as aforedescribed, so that it is not necessary to create a high vacuum in the hold to effect translation of the piston and cargo train. The piston and cargo platform preferably have bottom surfaces constructed as in FIG. 4, that is, with a lamina of resiliently compressible material faced off with an abrasion resistant flexible covering for cooperation with the floor.

In unloading the cargo, by pressure, the turbine continues to rotate in the same direction as before, but the valves are repositioned as shown in FIG. 7, where the valve 77 is opened, valve 81 is moved to close the exhaust line and compressed air is fed through duct 79 to the rear face of the now adjacent piston 82, resulting in forcing it to move to the front of the hold, pushing the cargo ahead of it and the cargo is moved onto the loading platform and is decoupled for transportation elsewhere.

It will be understood that should it be desired to effect loading translation of the piston and cargo train by means of air pressure, rather than using pressure to unload the vehicle, applied to the piston, the conduits 74 and 79, as shown in FIG. 6, could be run to the extreme front end of the hold, ahead of the piston 82, leaving the turbine in the same position in the tail and having the same construction of intake and exhaust as that previously described. The piston would still lie initially in the front of the hold with the cargo train trailing it, the nose section would then be closed and the turbine would operate to supply pressure air to the nose-confronting face of the piston. The air pressure from the turbine would then force the piston 82 rearwardly, dragging with it the cargotrain. The pressure differential required for each 4100 pounds of load would still be of the order of ¼ p.s.i., and the pressure at the outlets 32 would still be of the order of 5 p.s.i.

In FIG. 8 there is shown a friction-reducing floor 90 that is somewhat more detailed than that shown diagrammatically in FIG. 4. It comprises an upper planar, rigid member 92 on which the piston-type containers or piston and cargo-train glide with a coefficient of sliding friction of approximately 0.01 and a lower planar, rigid member 94. Members 92 and 94 are spacedly united together by a transversely corrugated metallic strip 96 also constituting a truss or reinforcement. Member 96 includes in each of its webs multiple apertures 100 communicating all parts of the plenum chamber 98 with the source of pressurized air employed in lubricating and buoying the containers on the "glide" floor. The spring-biased ball-valve 60 is arranged in an apertured plate 58 secured in member 92. The cargo floor is made up of segments all constructed like that shown in FIG. 8 and arranged in edgewise abutting relationship.

In the variant of FIG. 9, it is contemplated that only the last-inserted container, that one which is at the time nearest the slide-loading door, needs to be so well sealed and fitted as to block entirely the air pressure from passing around the edges of the container in the loading procedure. It is deemed, in this species, that there will be a certain amount of loss of pressure air around the edges of all but the aforesaid last-loaded, piston-action container, as when these non-seal bearing containers move far into the front of the fuselage. This air loss will be offset, however, by the savings accruing from omitting all seals from the peripheries of all the containers, no container carrying a seal.

However, each container is, for a short time and distance after it is side-loaded, sealed to the periphery of the inner cylindric wall of the fuselage, this time period being sufficient to enable it to gather momentum and move some distance toward the nose, even though only a single seal 134 is employed. This seal 134 is substantially the same in nature, composition, and construction as those designated 34 or 35 hereinabove but is a single entity fastened or otherwise secured on its outer periphery to the periphery of the inner cylindric face of the fuselage. It may or may not be inflatable and deflatable, as may be desired. In either case, it is disposed just forwardly of the front edge of the side-loading cargo door, where it will engage and seal successive containers, until they are "pistoned" so far forward by air pressure by momentum or by abutting successive containers, that the container is no longer engaged by seal 134.

The "last in" container, as shown, always is in sealing engagement with 134 in order to take full advantage of the entire air pressure thereon so that, if necessary after apparently proper but not actually exact stowage, pressure can again be applied to the "last in" container to "take up slack" and effect the desired tight stowage of the containers in their exact predetermined stowage stations, so as to minimize cargo shifting.

The several embodiments described in detail hereinabove are exemplificatory merely, and it will be understood by those skilled in this art that the inventive concepts are susceptible of embodiment in other specific forms lying within the scope of the sub-joined claims which define the metes and bounds of the invention.

We claim:
1. A cargo handling system comprising:
a vehicle with a substantially hollow body having a cargo space, said body including a substantially horizontal floor;
an upright, generally rectangular container having a lower face, top face, side faces, and solid front and rear vertical faces;
resilient pad means on said lower face of said container, said container disposed on said floor and substantially filling the cross-sectional dimension of said cargo space;
at least one resiliently compressible seal extending generally transversely of said container about its side and top faces, the portion extending about said top face positioned so as to maintain an air-tight seal with said cargo space when said lower face of said container is approximately several hundredths inch above the floor of said cargo space
air compressor means mounted on said vehicle for establishing an air pressure differential on said front and rear vertical faces of said container so as to urge said container longitudinally along the interior of said body;
spring biased contact valve means located in said floor for establishing an air film between the lower face of said container and said floor for reducing the sliding friction between said container and said floor, said valve means being in communication with said air compressor means; and
means for controlling the flow of air, said means located adjacent the forward and rearward portions of said body.

2. In a cargo holding system;
a substantially hollow body having a cargo space including a floor;
an upright generally rectangular object having sides, a top, a lower face and solid front and rear vertical faces, said object resting on said floor and substantially filling the cross-sectional dimensions of said cargo space;
at least one resiliently compressible seal extending generally transveresly of said object about its sides and top, positioned so as to maintain an air tight seal with said cargo space when said lower face of said object is spaced above said floor by a distance of the general order of magnitude of several hundredths inch;
turbine means located at one end of said body for establishing an air pressure differential on said vertical faces of said object so as to urge said object longitudinally along the interior of said body;
contact operated valve means located in said floor of said body for establishing an air film between the lower face of said object and said floor to reduce the sliding friction between said object and said floor; and
tying means located on an external vertical face of said object.

3. A cargo holding system comprising;
a substantially hollow body having a cargo space including a floor;

an upright object having a lower face and solid front and rear vertical faces, said object resting on said floor and substantially filling the cross-sectional dimensions of said cargo space;

sealing means disposed between said object and said body to enable the longitudinal movement of said object in said body like a piston, by air pressure differential created between opposite vertical faces of the object;

air turbine means having an intake and a discharge;

a first conduit connected between the intake of said turbine means and one end portion of said body for moving said object by a vacuum force;

valve means for closing said first conduit;

a second conduit connected between the discharge of said turbine means and the same end portion of said body to which said first conduit is connected for moving said object by compressed air forces;

second valve means for closing said second conduit;

a third conduit connected to said discharge of said turbine means and extending longitudinally of said body onto said floor of said body, said floor including contact operated valves therein communicating with said third conduit and adapted to emit air onto said floor from said conduit;

an opening in said body for admitting and discharging cargo therefrom, said opening located a predetermined distance from said end portion of said body to which is connected said first and second conduits; and tying means located on an external vertical face of said object.

4. A cargo holding system comprising:

a substantially hollow body having a cargo space including a floor;

an upright object having a lower face and solid front and rear vertical faces, said object resting on said floor and substantially filling the cross-sectional dimensions of said cargo space;

sealing means mounted on said object at least along portions thereof situated above said lower face for disposal of said sealing means between said object and said body to enable the longitudinal movement of said object in said body like a piston, by air pressure differential created between opposite vertical faces of the object;

air turbine means having an intake and a discharge;

a first conduit connected between the intake of said turbine means and one end portion of said body for moving said object by a vacuum force;

valve means for closing said first conduit;

a second conduit connected between the discharge of said turbine means and an end portion of said body for moving said object by compressed air forces;

second valve means for closing said second conduit;

a third conduit connected to said discharge of said turbine means and extending longitudinally of said body onto the floor of said body, said floor including contact operated valves therein communicating with said third conduit and adapted to emit air onto said floor from said conduit; and an opening in said body for admitting and discharging cargo therefrom, said opening located a predetermined distance from said end portion of said body to which is connected said first conduit, whereby said object may be moved by vacuum forces towards said end portion to which is connected said first conduit.

References Cited by the Examiner

UNITED STATES PATENTS

| | | | |
|---|---|---|---|
| 549,936 | 11/95 | Rush | 243—33 |
| 1,053,368 | 2/13 | Eells | 104—138 X |
| 1,074,890 | 10/13 | Nelson | 243—12 |
| 1,411,597 | 4/22 | Trask. | |
| 2,511,979 | 6/50 | Goddard | 104—138 |
| 2,567,392 | 9/51 | Naught. | |
| 2,814,064 | 11/57 | Montgomery. | |
| 2,848,820 | 8/58 | Wallin et al. | |
| 2,918,183 | 12/59 | Petersen et al. | |
| 2,927,661 | 3/60 | Kristek et al. | 187—17 |
| 2,944,684 | 7/60 | Dennis. | |
| 3,097,718 | 7/63 | Jay et al. | 180—7 |

HUGO O. SCHULZ, *Primary Examiner.*

GERALD M. FORLENZA, MORRIS TEMIN, *Examiners.*